United States Patent [19]
Philip et al.

[11] 3,906,164
[45] Sept. 16, 1975

[54] DIGITAL SWITCHING NETWORKS WITH FEED-BACK LINK FOR ALTERNATE ROUTING

[75] Inventors: Alexander Schroder Philip; John Spencer Arnold, both of Liverpool, England

[73] Assignee: Plessey Handel und Investments A.G., Zug, Switzerland

[22] Filed: Apr. 16, 1974

[21] Appl. No.: 461,460

[30] Foreign Application Priority Data

Apr. 19, 1973 United Kingdom.............. 18872/73

[52] U.S. Cl...... 179/18 EA; 179/15 AT; 179/15 AQ
[51] Int. Cl.²........................................... H04M 3/00
[58] Field of Search....... 179/18 EA, 18 GF, 15 AT, 179/15 AQ, 15 AL

[56] References Cited

UNITED STATES PATENTS

| | | | |
|---|---|---|---|
| 3,541,267 | 11/1970 | Fukutomi | 179/18 EA |
| 3,566,041 | 2/1971 | Ekberg | 179/18 EA |
| 3,597,548 | 8/1971 | Drinnan | 179/15 AT |
| 3,637,941 | 1/1972 | Rekiere | 179/15 AQ |

*Primary Examiner*—David L. Stewart
*Attorney, Agent, or Firm*—Blum, Moscovitz, Friedman & Kaplan

[57] ABSTRACT

In a two-stage switching network wherein each primary (A) switch has access to each secondary switch over an individual link, the failure of any one link seriously affects accessibility as between incoming and outgoing paths of the network. The present proposal is applicable where said paths are t.d.m. highways as in the digital switching subsystem (D.S.S.), and enables three requirements to be met (1) serial re-routing to avoid effect of an internal faulty link (2) avoidance of normal traffic blockages external to the two-stage network by use of second attempt connection, and (3) arbitrary access to and from digital loss pads providing R.O.M. translation of speech code level. The revised trunking of the two-stage network involves a "feed-back link" from the outgoing side of each B switch to the incoming side of the corresponding A switch. This enables any failed link to be avoided by 3 passes over the network; one of the passes being over any "feed-back link" except the two associated with switches of the failed link. Having provided the feed-back links primarily for evasion of faulty direct links, they are additionally used to include said digital loss pads. The t.d.m. channels in any feed-back link are subjected to the loss-pad facility or direct-switching of re-routed connections, as arbitrarily required, by suitable gating. In some circumstances time-sharing of one R.O.M. loss pad between two feed-back links is possible.

2 Claims, 3 Drawing Figures

DIGITAL SWITCHING NETWORKS WITH FEED-BACK LINK FOR ALTERNATE ROUTING

The present invention relates to telecommunication switching networks and is more particularly concerned with so-called space switching networks which are suitable for incorporation in time division multiplex switching systems.

Telecommunication exchange switching systems handling time division multiplex information, typically involving pulse code modulated speech samples, includes both time switching and space switching arrangements. Typically the time switching arrangements may involve random access storage devices or delay line storage devices and these time switching arrangements are used to permit connection between differing time division multiplex channels. Interconnection between the time division multiplexed paths (e.g. junctions) is performed by the space switching arrangements.

Typically the exchange switching system may be fabricated using incoming (receive) and outgoing (transmit) time switching storage devices allocated on a per junction basis which are served in common to a group of such devices by receive and transmit superhighways respectively. The receive and transmit superhighways are interconnected by way of a two-stage space switching network comprising symmetrical matrice of electronic gating circuits. Each matrix crosspoint when "made" passes one complete channel of information and typically each crosspoint comprises a plurality (e.g. eight) of parallel AND gated paths.

In a two-stage space switching network of the above type, providing full availability, each primary switch obtains access to each secondary switch over an individual link, the failure of any inter-switch link seriously affects assessibility between the incoming and outgoing paths of the network. In the case of a time division multiplex (t.d.m. switching exchange employing a time-space-time type of exchange network, each path of the symmetrical space switching network carries typically 256 t.d.m. channels and if say 16 incoming paths are terminated upon one primary switch a failure of one link from such a primary switch affects the accessibility between some 4,096 incoming and outgoing exchange channels.

Such problems may be overcome by the addition of a single centre or third switching stage having one appearance for each primary switch. Such an arrangement however is expensive and involves complications when considering the path selection arrangements.

Accordingly, it is an object of the present invention to provide a two stage space switching network which incorporates arrangements to overcome the above disadvantages in an inexpensive and efficient manner.

According to the invention there is provided a two-stage full availability space switching network for use in a time division multiplex telecommunication switching system in which said network includes a plurality of primary stage switching matrices (connecting groups of receive superhighways to a plurality of interstage links) and a plurality of secondary stage switching matrices, (connecting a number of inter-stage links to a group of transmit superhighways) and each secondary stage switching matrix includes one additional outlet whereas each primary stage switching matrix includes one additional inlet and a plurality of feed-back paths are provided each interconnecting, on a mutually exclusive basis, one additional outlet with one additional inlet.

In one embodiment of the invention each feed-back path includes a switchable digital loss pad allowing for selective equalisation between incoming and outgoing channels in addition to the facilities provided by the feed-back links.

The invention, together with its various features, may be more readily understood from the following description of two embodiments thereof. The description should be read in conjunction with the accompanying drawings which are as follows:

FIG. 2 shows a block diagram of a space switching network according to one embodiment of the invention, whereas.

Figure 1:
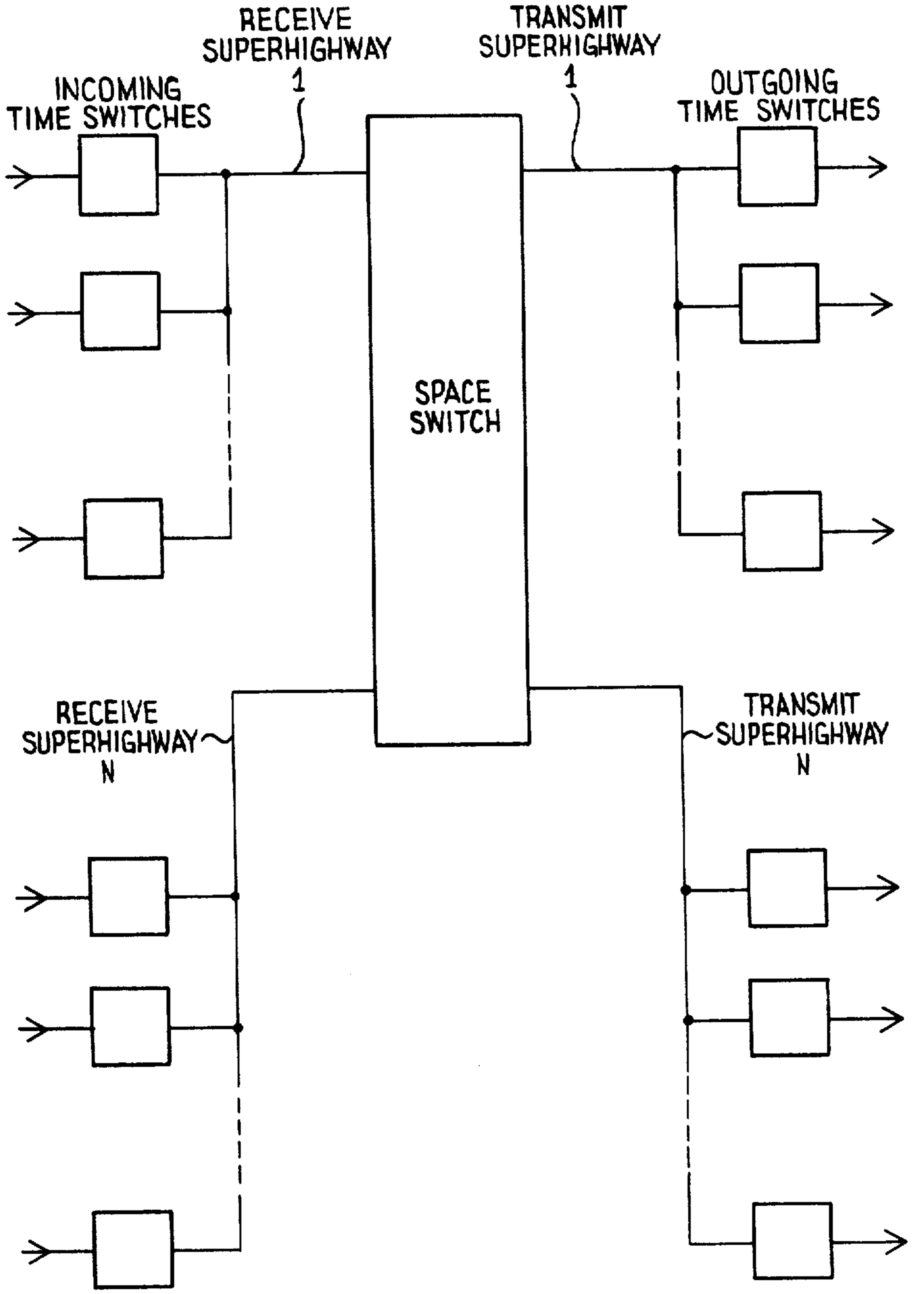
FIG. 1 shows a simplified block diagram of the switching stages used in a typical t.d.m. exchange suitable for the incorporation of a space switching network according to the invention.

Referring firstly to FIG. 1 consideration will be given to the skeleton of a typical exchange network for use in a time division multiplex (t.d.m.) exchange handling digital information (e.g. pulse code modulated samples). The exchange network includes one space switching network interposed between two time switching networks. The incoming and outgoing time switching networks are very similar and each includes a small random access memory for each incoming or outgoing highway served. The incoming time switching stages may conveniently accord with that shown in our co-pending application No. 38058/71. Basically each incoming highway, which accommodates say 32 eight-bit pulse code modulated (p.c.m.) channels, is served by its own 32 word random access memory and the received information (i.e. 30 channels of speech information plus one synchronisation channel and one signalling channel) is written cyclically, on a per channel basis in each frame, into the word location of the random access memory. A group of incoming time switches, say eight, are served by one receive superhighway and each channel of the eight highways is read cyclically on a channel-in-parallel basis in each frame.

The space switch is provided to connect, for each super-highway time slot, a channel of a receive superhighway to a corresponding channel of a transmit superhighway and thence into a particular location in a particular outgoing time switch random access store. The switching network employed for the space switch is in one emboidment thereof, shown in FIG. 2. Each switching matrix takes the form of a 16 × 16 switch and each stage includes 16 matrices. Each primary matrix serves 15 receive superhighways (RS1 to RS15) in the case of matrix P1 on its inlets and 16 inter-stage links (1L1 to 1L16) on its outlets. Similarly each secondary matrix serves 16 inter-stage links (1L1 to 16L1 in the case of matrix S1) on its inlets and 15 transmit superhighways (TS1 to TS15) on its outlets. The additional inlet on each primary switch is connected individually by a feed-back link (FB1 to FB16) to the additional outlet on the correspondingly numbered secondary matrix.

The provision of the feed-back links (FBL1 to FBL16) allows any failed link to be by-passed using one such feed-back link and two passes over the space switching network. For example it will be assumed that link 2L2 fails thereby preventing interconnection between receive superhighways RS16 to RS30 and transmit superhighways TS16 to TS30. If it is now required to connect say a channel on receive superhighway RS16 to a channel on transmit superhighway TS30 it is necessary to use one of the feed-back paths provided by the invention. Typically a path can be set-up from say (a) primary matrix P2 to secondary matrix S16 (using good link 2L16), (b) secondary matrix S16 to primary matrix P16 (using the feed-back link FBL16) and (c) primary matrix P16 to secondary matrix S2 (using good link 16L2).

The attraction of the simple "serial trunking" security mechanism described above is enhanced by its potential for use under "second-attempt" path-setting situations to by-pass traffic blocked inter-stage links.

Figure 2:
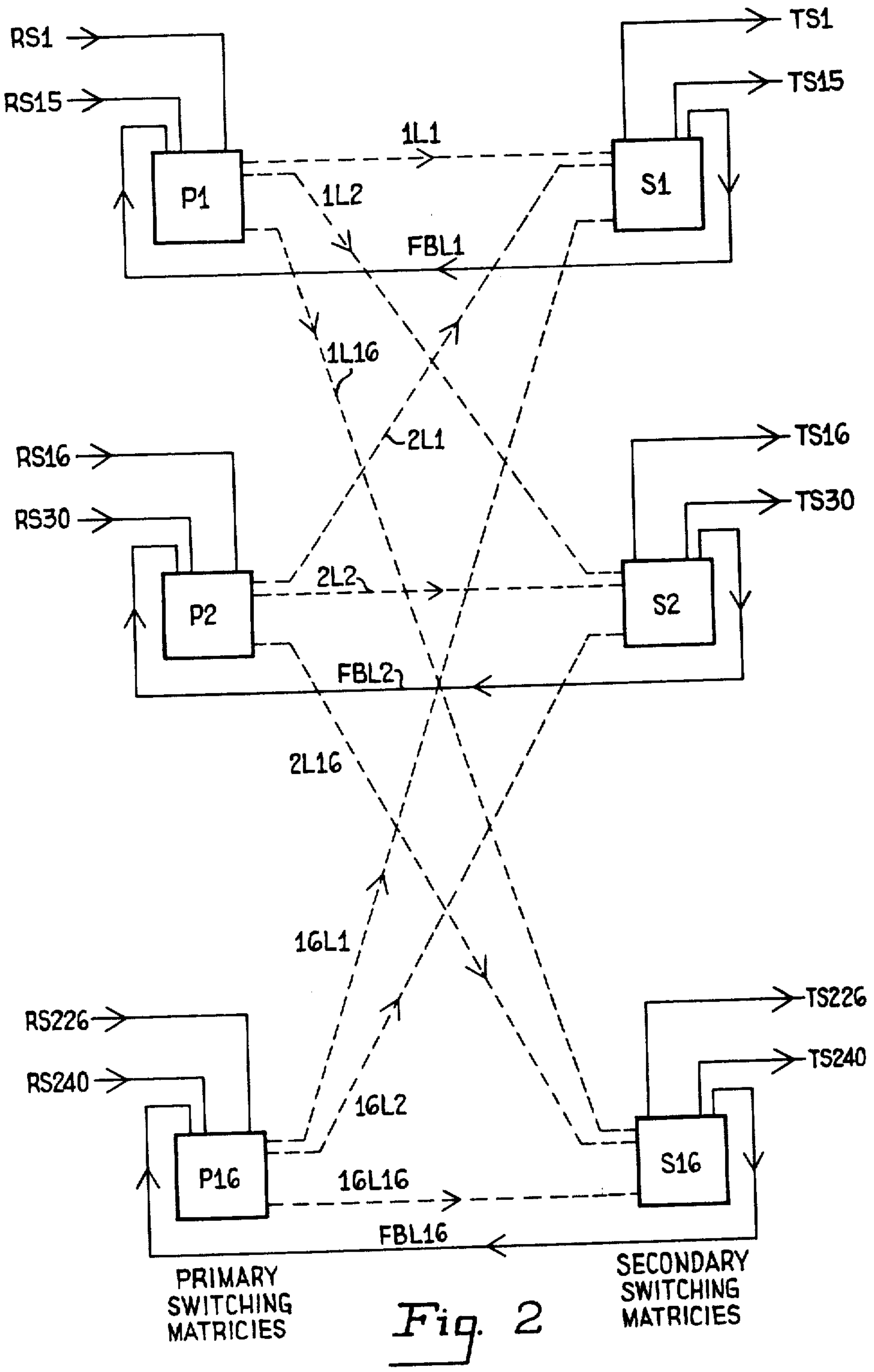

In certain circumstances a digital switching network may carry a mix of two types of connection each with a different specified transmission loss. Specifically some connections, such as intergroup-switching-centre connections, may require a nominal loss of 3db between two-wire points while others, such as transit network trunk circuits, require a 7db loss. Consequently it is necessary for the exchange to include digital loss pads and the feed-back links of FIG. 2 provide convenient points for the incorporation of such pads.

Figure 3:
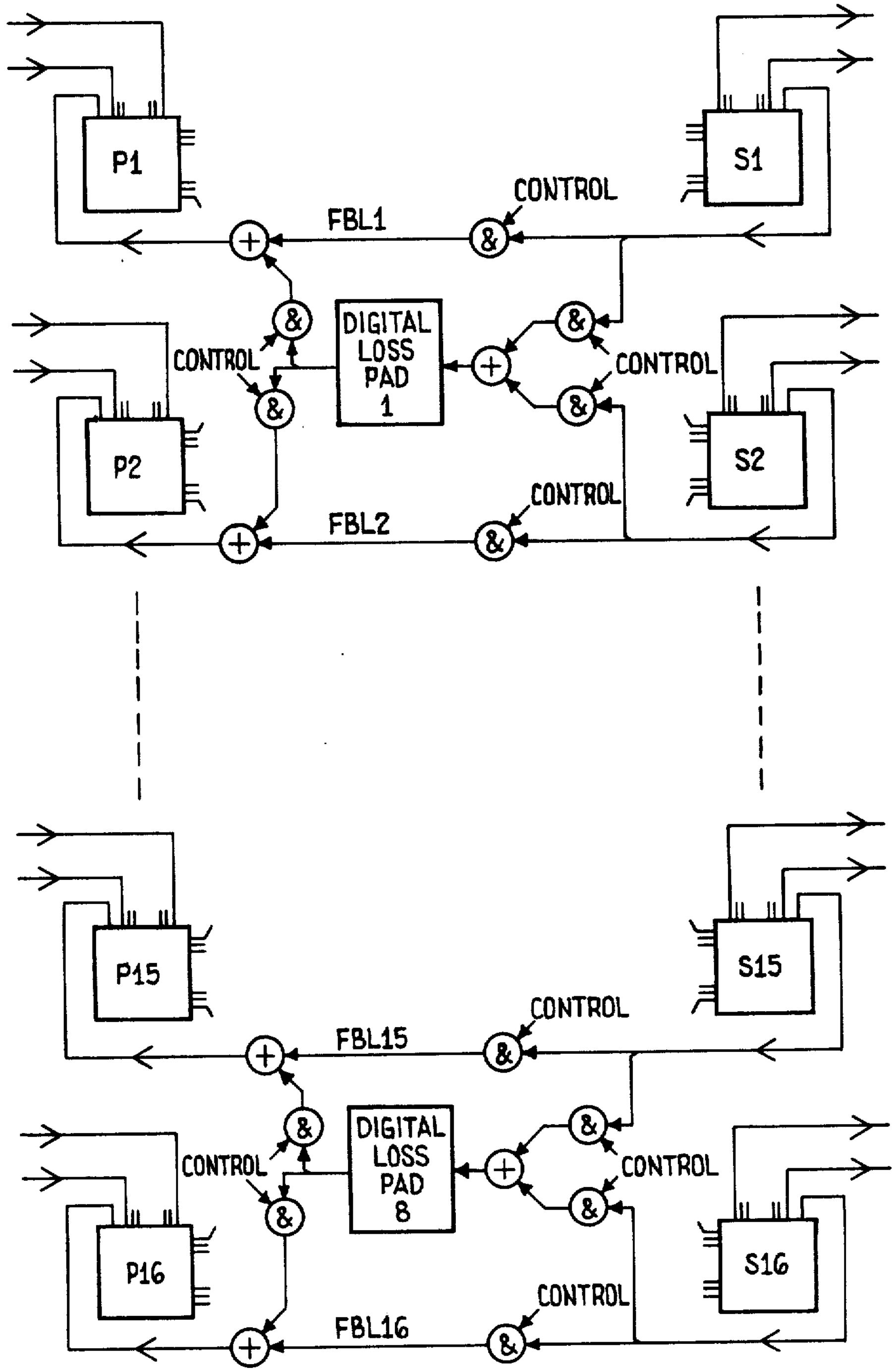
FIG. 3 shows a block diagram of a space switching network according to a second embodiment of the invention.

FIG. 3 shows how this condition can be achieved by the incorporation of read-only-memory speech code level translation (loss pad) devices (DLP1 to DLP8). Typically each loss pad device has one eight bit word for each p.c.m. speech code level (i.e. 256 words in the case of a 32 channel eight bit p.c.m. system). The words are addressed by the incoming code word and each location contains, as data, that code which is calculated to correspond to an ndb difference in power level to that code defining its address. The read only memory output is used to replace the speech code input and the power level transformation is immediately executed.

FIG. 3 shows the time sharing of each feed-back link between the loss-pad facility and the fault/blocking by-pass mechanism. The loss-pad included in the feed-back loop must be "short-circuited" by channels using the link for rerouting round faulty or blocked centre-links. The t.d.m. gating which executes this short-circuiting and determines whether or not a code level translation is performed, may be controllable by software interrogation/set-up algorithms or may be governed by wired-in logic operating on the control gating signals shown in FIG. 3.

If complimentary sets of loss-pad slots are used on adjacent feed-back links, (e.g. odd slots on odd links, even slots on even links,) it becomes possible to time share one read-only-memory loss-pad between the two feed-back links of each matrix. Then each loss-pad is fully utilised whilst still allowing the desired mix of loss pad slots and fault by-pass slots on all links.

The use of serial trunking in the digital switching network for by-passing blocked and faulty centre links and for, simultaneously providing a loss-pad access facility, is both economical and efficient and the principle may be extended to, for example, use of the loss pads to perform other code conversions.

The above description has been of the two embodiments only and has shown for clarity only one simplex path and it should be realised that there are two symmetrical simplex paths in each duplex connection.

Alternative arrangements to those shown will readily be seen by those skilled in the art. For example the feed-back paths of FIG. 2 are shown interconnecting the additional inlet and outlet of correspondingly numbered primary and secondary matrices whereas staggered feed-back connections are quite feasible (i.e. say S1 to P2 etc.) Also in FIG. 3 the digital loss pads are shown shared between a pair of feed-back links whereas individual loss pads for each feed-back link could be provided if necessary. Additionally reference has been made to the suitability of the equipment for use with 32 channel p.c.m. transmission systems, whereas, only minor modifications are necessary to accommodate say 24 channel p.c.m. systems.

What we claim is:

1. A two-stage full availability telecommunications space switching network particularly adapted for use in a time division multiplex switching system comprising a plurality of primary stage switching matrices adapted to connect groups of receive superhighways to a plurality of interstage links, a plurality of secondary stage switching matrices adapted to connect a number of interstage links to a group of transmit super-highways, each secondary stage switching matrix including one additional outlet and each primary stage switching network including one additional inlet, and a plurality of feed-back paths each interconnecting on a mutually exclusive basis, one additional outlet with one additional inlet, each said feed-back path also including a switchable digital loss pad for allowing selective equalization between incoming and outgoing channels.

2. A two-stage full availability telecommunications space switching network as claimed in claim 1 and in which said digital loss pad comprises a read-only memory in which each location stores the nbd difference value of its address.

* * * * *